Figure 1:
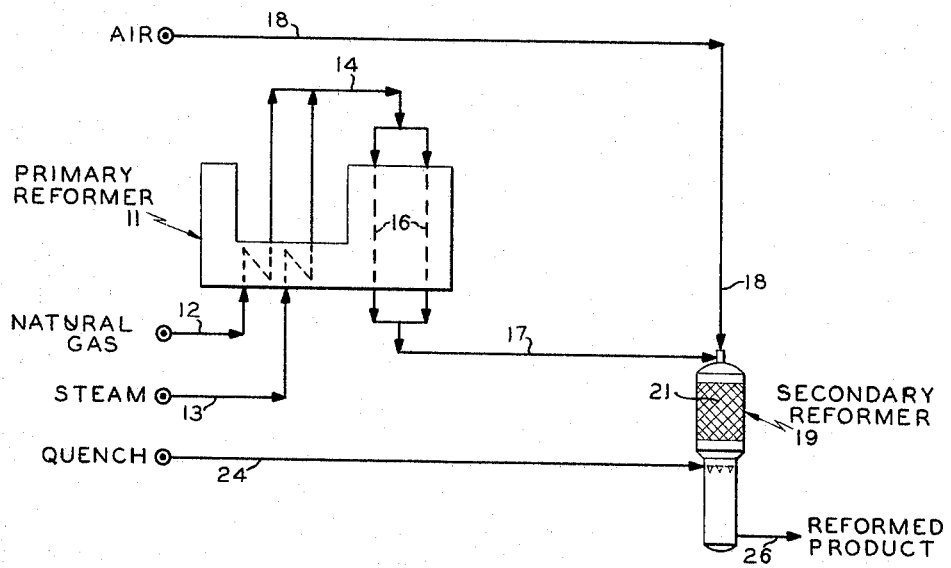

Aug. 2, 1966  O. J. QUARTULLI ETAL  3,264,066
PRODUCTION OF HYDROGEN
Filed May 1, 1962

INVENTORS
ORLANDO J. QUARTULLI
SHOU KAO
BY *G. H. Palmer*
*John L. Sunilau*
ATTORNEYS
*Don H. Phillips*
AGENT

United States Patent Office 3,264,066
Patented August 2, 1966

3,264,066
PRODUCTION OF HYDROGEN
Orlando J. Quartulli, Bronx, and Shou Kao, Whitestone, N.Y., assignors to Pullman Incorporated, a corporation of Delaware
Filed May 1, 1962, Ser. No. 191,565
14 Claims. (Cl. 23—212)

This invention relates to an improved process for the production of hydrogen from hydrocarbons. In one aspect, the invention relates to an improved method of converting hydrocarbons to a mixture of hydrogen and carbon monoxide suitable for the preparation of ammonia synthesis gas.

Hydrogen and mixtures of hydrogen and carbon monoxide have found widespread use as starting materials in the production of various organic and inorganic compounds. For example, ammonia is prepared by catalytic synthesis from hydrogen and nitrogen at elevated pressures. Also, mixtures of hydrogen and carbon monoxide are useful in the synthesis of hydrocarbons, such as those boiling in the gasoline range, and of oxygenated hydrocarbons such as alcohols and ketones. Petroleum fractions, including normally gaseous and normally liquid hydrocarbons, constitute an abundant source of hydrogen and of mixtures of hydrogen and carbon monoxide. Many commercial processes have been developed to use petroleum fractions in the production of various synthesis gases. One of the most efficient of these commercial processes involves two-stage reforming at pressures up to about 125 pounds per square inch gauge (p.s.i.g.) by contacting the hydrocarbon feedstock as a vapor with steam in a first indirectly heated reforming zone (primary reformer) to convert a portion of the hydrocarbon to hydrogen and carbon monoxide through endothermic reforming and then contacting products of the first reforming zone with steam and air in a second unheated reforming zone (secondary reformer) to substantially complete the conversion of the hydrocarbon to hydrogen and carbon monoxide through a combination of exothermic partial combustion and endothermic reforming. The two-stage process is particularly applicable to the preparation of ammonia synthesis gas since the introduction of air to the secondary reformer can be controlled to provide the nitrogen requirement of subsequent ammonia synthesis. Such a process is described in a patent to Barry et al., U.S. 2,829,113, granted April 1, 1958.

As indicated, two-stage reforming according to this prior art method has been practiced at pressures up to about 125 p.s.i.g. Since the synthesis processes, for example, which use the reformed gas frequently require much higher pressure (3000-20,000 p.s.i.g. in the case of ammonia synthesis), there is a substantial incentive to develop methods by which the reforming process can be carried out economically at pressures well above 125 p.s.i.g. in order to reduce the cost of compressing the reformed gas. The obstacles to reforming at pressures higher than 125 p.s.i.g. arise from the adverse effect of increasing pressure on the equilibrium of the reforming reaction. Thus, the steam reforming reaction involves a net increase in mols of gas. The reaction equation with methane is typical:

$$CH_4 + H_2O = 3H_2 + CO$$

Increase in the reforming pressure therefore causes a decline in the extent of hydrocarbon conversion, other factors being equal, by shifting the equilibrium of the reforming reaction to the left.

These circumstances constitute a serious problem since, in the case of the production of ammonia synthesis gas for instance, the hydrocarbon must be substantially completely converted in the two stages of reforming to prevent the presence of excessive inert hydrocarbons in the reformed synthesis gas. Frequently, air is used exclusively in the secondary reformer to provide oxygen for partial combustion. In such cases, the amount of air which can be used is restricted by the nitrogen requirements of the synthesis gas. Accordingly, the heat produced by partial combustion available to complete the endothermic reforming reaction in the otherwise unheated secondary reformer is similarly restricted. Thus, lower conversion resulting from higher pressure in the primary reformer has been considered unacceptable in commercial reforming for the production of ammonia synthesis gas.

The adverse effect of pressure upon reaction equilibrium can be reversed theoretically by raising the temperatures maintained in the first reforming zone but because of structural limitations of the externally heated reforming tubes therein, temperatures appreciably above those now employed in commercial practice, i.e., about 1400 to about 1600° F., are not technically feasible. The stress limitations of the reforming tubes are such that as pressures are higher, permissible temperatures are lower. The adverse effect of pressure upon equilibrium can also be reversed theoretically by increasing the amount of steam supplied with the hydrocarbon feed to the first reforming zone. In this way, conversion levels by primary reforming at high pressure can be obtained substantially equal to those at low pressure. While this method is effective and economical up to relatively high pressures, for example about 175 p.s.i.g., it has the disadvantages of requiring larger equipment and large amounts of steam and fuel. Hence, the problem remains of developing a reforming technique effective and economical at pressures still higher than about 175 p.s.i.g. and one more efficient and economical at any superatmospheric pressure.

It is an object of the present invention to provide an improved process for the production of hydrogen from hydrocarbons. More specifically, it is an object of the invention to provide improvements in a two-stage reforming process for the production of ammonia synthesis gas by which investment and operating costs are substantially reduced as compared with present processes. Detailed objects include lowering the steam and fuel requirements and raising the pressure of two-stage reforming processes for the production of ammonia synthesis gas. Numerous other objects and advantages of the invention will be apparent from the following detailed discussion and description.

The above objects are accomplished in a two-stage reforming process in accordance with the invention by the use of intermediate heat exchange between the first and second reforming zones. The effluents of the first and second reforming zones are passed in indirect heat exchange with one another thereby raising the temperature of the effluent of the first reforming zone (and of the feed to the second reforming zone) while decreasing the temperature of the effluent of the second reforming zone. The effect of this intermediate heat exchange is to shift a portion of the reforming load to the second reforming zone thereby permitting operation of the first reforming zone at lower temperatures and higher pressures. At the same time, the thermal efficiency of the process is improved since heat is recovered from the effluent of the second reforming zone for direct use in the process. In prior art methods of two-stage reforming, the hot effluent of the second reforming zone has been quenched with water thus wasting the high level heat available in the effluent of the second reforming zone.

The improved process of the invention thus comprises contacting a vaporized hydrocarbon with steam in the presence of reforming catalyst in a first indirectly heated reforming zone maintained under suitable conditions including a superatmospheric pressure to partially reform the hydrocarbon, further heating effluent from the first reforming zone by heat exchange with a second effluent to be described, contacting further heated effluent of the first reforming zone with steam and an oxygen-containing gas in the presence of reforming catalyst in a second unheated reforming zone maintained under suitable conditions to substantially complete the reforming of the hydrocarbon at a superatmospheric pressure, and cooling effluent of the second reforming zone constituting the second effluent by the heat exchange with effluent of the first reforming zone. In a preferred method of operation, the oxygen-containing gas supplied to the second reforming zone is also preheated in the first reforming zone.

The hydrocarbon supplied to the first reforming zone can be any hydrocarbon or mixture of hydrocarbons which is capable of being vaporized and reacted under the process conditions used. Feeds such as natural gas and light hydrocarbons including, for example, light naphtha can be successfully reformed by the present process. For the heavier hydrocarbons and olefinic hydrocarbons, greater amounts of steam are required than for the reforming of lighter and saturated hydrocarbons.

Both the hydrocarbon feed and the steam supplied to the first reforming zone are preferably preheated, the hydrocarbon feedstock to as high a temperature as is consistent with avoiding pyrolysis or other heat deterioration. Since steam reforming is endothermic and there are practical limits to the amount of heat which can be added by indirect heating in the first reforming zone, preheating of the feed facilitates attainment and maintenance of suitable temperatures therein. Generally, it is preferred to preheat both the hydrocarbon feed and the steam to a temperature at least 50° F. above the dew point temperature of the combined stream.

In the first reforming zone, the hydrocarbon-steam admixture is contacted over steam reforming catalyst preferably disposed in a plurality of furnace tubes which are in turn preferably disposed in the radiant section of a furnace. Fuel is burned in the furnace to externally heat the reforming tubes and to supply the endothermic heat of reforming consumed therein. Any one or more of the known reforming catalysts can be used. The metals of Group VIII of the Periodic System having an atomic number not greater than 28 and/or oxides thereof and metals of the left-hand elements of Group VI and/or oxides thereof are known reforming catalysts. Specific examples of reforming catalysts which can be used are nickel, nickel oxide, cobalt oxide, chromia and molybdenum oxide. The catalyst used can include promoters and can have been subjected to various special treatments for the purpose of enhancing its properties. The composition and method of preparation of the catalyst used form no part of this invention and therefore are not further described. Generally, promoted nickel oxide catalysts are preferred.

The conditions used in the first reforming zone promote substantial conversion of the hydrocarbon feedstock to hydrogen and carbon monoxide and are selected specifically to provide an effluent, the methane content of which can be substantially completely converted in the second reforming zone under the conditions therein. Thus, the effluent of the first reforming zone has a residual methane concentration and temperature which, after further heating by intermediate heat exchange, permit reaction at the required relatively high reforming temperature of the unheated second reforming zone using only the amounts of air determined by the nitrogen requirements of the ammonia synthesis gas.

Conditions maintained in the first reforming zone include a superatmospheric pressure. The specific superatmospheric pressure used is influenced by the pressure requirements of the subsequent process in which the hydrogen product of the present process is to be employed. Pressures as high as 1000 p.s.i.g. can be maintained. Although any superatmospheric pressure can be used in practicing the present improved process, pressures of about 175 to about 700 p.s.i.g. are preferably maintained when ammonia synthesis gas is being produced in order to reduce the requirements for subsequent compression of the synthesis gas. Where a nitrogen-free hydrogen product is sought at a delivery pressure below about 175 p.s.i.g., intermediate heat exchange in accordance with the invention has the advantage of reducing the pure oxygen requirement of the second reforming zone. On the other hand, where ammonia synthesis gas is being produced at a pressure below about 175 p.s.i.g., adjustment of the temperature and/or the steam rate in the first reforming zone is normally sufficient, without intermediate heat exchange, to attain the required level of conversion. At pressures above about 175 p.s.i.g., however, and particularly at pressures above about 350 p.s.i.g., it becomes increasingly impractical to compensate for declining conversion by these expedients regardless of the use to which the product is to be put and the use of intermediate heat exchange in accordance with the invention becomes not only practical but increasingly advantageous. Thus, it is still more preferred to maintain pressures of about 350 to about 700 p.s.i.g. for commercial operations. The temperature to which the reactants are heated while contacting the catalyst in the first reforming zone is sufficiently high to obtain extensive conversion but no higher in any case than the stress limitations of the catalyst tubes will allow. The specific temperature used is therefore influenced by the specific pressure used. In general, the reactants in the first reforming zone are heated to a temperature of about 1300 to about 1600° F. but where the more preferred pressure conditions mentioned above are used, temperatures are somewhat less and are about 1350° F. to about 1500° F. The higher temperatures will be used at the lower pressures and vice versa.

Under the indicated conditions of operation, the effluent of the first reforming zone contains about 3 to about 25 mol percent methane on a dry basis, more usually about 8 to about 18 mol percent methane on that basis. Residual methane levels can also be somewhat higher than about 25 mol percent, particularly where the higher pressures and lower steam rates are combined. The upper limit of allowable residual methane concentration in the effluent of the first reforming zone is principally influenced by the concentration at which pyrolysis or carbonization occurs at the high temperature conditions which prevail at the inlet of the second reforming zone. The specific residual methane concentrations stated are below this carbonization concentration. The unconverted hydrocarbons from the first reforming zone are essentially methane regardless of the character of the hydrocarbon feed supplied to the first reforming zone because heavier hydrocarbons are rapidly converted to methane under reforming conditions. The amount of steam which is supplied with the hydrocarbon feedstock is influenced by the requirement of avoiding carbon deposition on the steam reforming catalyst or other carbon formation and by the requirement of producing the aforesaid residual methane content in the effluent of the first reforming zone at the conditions maintained. On this basis, the steam-carbon ratio (defined as the ratio of mols of steam to atoms of organic carbon, i.e., carbon in hydrocarbon form) is about 1.1 to about 8.0. In the case of the preferred pressure and temperature conditions previously mentioned, the steam-carbon ratio is about 2.5 to about 7.5. Where the more preferred conditions are used, steam-carbon ratios of about 3.0 to about 6.5 apply.

The amount of catalyst used and the rate at which reactants are passed over the catalyst are defined in terms of residence times calculated by dividing the depth of the catalyst by the superficial linear velocity of the total gas mixture. In order to obtain the aforesaid conversion under the indicated conditions using the catalyst described, residence time of the feed materials in the catalyst bed of the first reforming zone should be held between about 0.5 and about 10 seconds, preferably about 1.5 to about 5 seconds.

The hot effluent of the first reforming zone is then subjected to intermediate heat exchange in accordance with the invention, that is, it is further heated by heat exchange with the hotter effluent of the second reforming zone. In this way, the temperature of the effluent of the first reforming zone is raised by about 100° F. to about 475° F. to a final temperature in the range of about 1400 to about 1775° F. The intermediate heat exchange is preferably accomplished by indirect heat exchange rather than by direct mixing of a portion of the effluent of the second reforming zone with that of the first reforming zone. Any suitable apparatus can be used for the intermediate heat exchange including, for example, single-pass and U-tube type exchangers. The heat exchange means should be positioned physically outside of either reforming zone in order to minimize problems of thermal expansion.

In one method of effecting the intermediate heat exchange, a packed-bed heat exchanger is used in which effluent of the first reforming zone is contacted over a bed of reforming catalyst surrounding tubes through which the effluent of the second reforming zone is passed. In this way, a slight increase in the level of reforming is accomplished in the course of the intermediate heat exchange thereby effecting a slight reduction in the amount of conversion which must be done in the first reforming zone. A particular advantage of this embodiment is that somewhat greater amounts of heat can be transferred with a substantially greater driving force for heat transfer as compared with non-catalytic intermediate heat exchange in view of the fact that a substantial portion of the heat supplied to the effluent of the first reforming zone is consumed as endothermic heat of reforming and there is consequently a smaller temperature rise of the effluent of the first reforming zone. Increase in the driving force for heat transfer reduces heat exchange surface required. In the absence of reforming catalyst, the bulk of the heat transferred is taken up as sensible heat, thus rapidly raising the temperature of the effluent of the first reforming zone and reducing the temperature difference between it and the effluent of the second reforming zone with an attendant reduction in the driving force for heat transfer.

The effluent of the first reforming zone heated by intermediate heat exchange, steam and an oxygen-containing gas are contacted in the presence of a reforming catalyst in a second unheated reforming zone. Any one or more of the catalysts mentioned as suitable for use in the first reforming zone are also suitable for use in the second reforming zone. The catalyst or catalysts used in the second reforming zone need not be the same as that used in the first reforming zone although generally, it is preferred to employ as one catalyst in the second reforming zone the same catalyst as is used in the first reforming zone. The relative quantities and temperatures of the reactants supplied to the second reforming zone and the conditions maintained therein are selected to cause substantially complete conversion of the residual methane in the effluent of the first reforming zone and to produce an effluent of the second reforming zone consisting essentially of hydrogen, carbon oxides, nitrogen (where ammonia synthesis gas is being prepared) and less than about 2.0 mol percent residual methane on a dry basis, preferably less than about 1.0 mol percent residual methane on that basis. Thus, the effluent of the second reforming zone constitutes, after removal of carbon oxides, an excellent ammonia synthesis gas since it is substantially free of inert materials which adversely affect the efficiency of ammonia synthesis.

Conditions in the second reforming zone include a superatmospheric pressure within the range given above for the first reforming zone. It is preferred to maintain the second reforming zone at substantially the same pressure as that of the first reforming zone, i.e., a pressure of about 165 to about 670 p.s.i.g., the difference in pressure being only the pressure drop of the system. The second reforming zone is maintained at outlet temperatures of about 1600° F. to about 1800° F., preferably about 1660° F. to about 1780° F. For efficient use of the catalyst, substantially lower outlet temperatures should be avoided. Temperatures substantially higher than 1800° F. are desirable and can be used from a process standpoint. Outlet temperatures are however now limited to about 1800° F. by the temperature limitations of the catalyst in the second-reforming zone and of the metals used in the intermediate heat exchanger. Sufficient oxygen is provided to the second reforming zone at one or more points to provide by partial combustion the heat required to complete the endothermic reforming reaction at the temperatures given. On this basis, about 0.05 to about 0.15 mols of oxygen per mol of dry gas in the feed to the second reforming zone is supplied. As used herein, the term "dry gas" includes all of the components of the hydrocarbon-containing gas in question, excepting steam. The amount of nitrogen which is supplied to the second reforming zone is that required to provide a mol ratio of hydrogen to nitrogen of about 3:1 in the final synthesis gas after reforming and removal of carbon oxides. While the oxygen and nitrogen can be separately introduced into the second reforming zone, it is preferred that they be introduced together in the form of air or oxygen-enriched air so as to avoid or minimize the requirements for air separation equipment. In those cases where the reformed gas from the present process should be substantially free of nitrogen, substantially pure oxygen only should be supplied to the secondary reformer rather than air in order to avoid subsequent processing for nitrogen removal. The amount of steam provided to the second reforming zone is controlled to give a volume ratio of water vapor to dry gas of about 0.4 to about 1.6, preferably about 0.6 to about 1.1. Normally the effluent of the first reforming zone contains sufficient steam to satisfy the requirements of the second reforming zone. Additional steam is added if necessary. In order to obtain the aforesaid conversion under the indicated conditions using the catalyst described, the residence time of the reactants in the catalyst bed or beds of the second reforming zone is above about 0.5, preferably about 1.0 to about 10 seconds.

The effluent of the second reforming zone is withdrawn and cooled in the intermediate heat exchange step previously described. In this way, the product gas is cooled by about 100° F. to about 400° F. to a temperature in the range of about 1700 to about 1400° F. The reformed product gas is then processed according to any suitable technique for purification and manufacture to form the desired synthetic chemical. Where the final product sought is ammonia, the first purification step consists ordinarily of shift conversion where carbon monoxide is converted catalytically with steam to form carbon dioxide and additional hydrogen at temperatures of approximately 700 to 850° F. Since the product gas, even after intermediate heat exchange, is at a higher temperature than that used in the shift conversion step, it is cooled in a quench boiler to raise steam for use in the process and it may also be subjected to a direct quench with water to provide the steam requirement of shift conversion. As mentioned, one important advantage of intermediate heat exchange in accordance with the invention is the direct use of high level heat available in the effluent of the second reforming zone for further heating effluent of the first reforming zone rather than dissipation of such heat by direct quenching as has been done heretofore. Up to about 20 percent of the heating duty of the primary reforming reaction can be supplied in this way. An important correlative advantage is a reduction in the heat available for raising steam. In prior art methods, steam raised in the quench boiler frequently exceeded plant needs so that, in the absence of a neighboring plant to which such steam could be exported, the excess steam was wasted. Such inefficiency is eliminated or substantially reduced by means of the present process.

The intermediate heat exchange between the effluents of the first and second reforming zones provides a portion of the heat required to complete the reforming reaction in the second reforming zone. As mentioned, this permits shifting part of the total conversion load from the first to the second reforming zone. Additional heat can also be supplied to the second reforming zone with consequent shift in conversion load to the second reforming zone by preheating one or more of the reactant streams provided thereto. This preheating can be done in one or more preheating sections provided in the first reforming zone. The preheating sections are to be distinguished from the reaction section in which the feed hydrocarbon and steam are contacted in the presence of reforming catalyst, already described. Where the first reforming zone is a furnace, the reaction section is preferably disposed in the part of the furnace which is radiantly heated as previously mentioned. The separate preheating sections can also be located in the part of the furnace which is radiantly heated or they can be located in the convection heated portion of the furnace or divided between both of these portions. Preheating is practiced to a temperature of about 800° F. to about 1500° F., preferably about 1100° F. to about 1400° F., in the case of preheating the oxygen-containing gas and to about 1400° F. to about 1600° F., preferably about 1450° F. to about 1550° F., in the case of preheating, i.e., further heating, the partially reformed effluent of the reaction section of the first reforming zone. Provision of one or more separate preheating sections in the first reforming zone rather than provision of special heaters is particularly advantageous because of the simplicity and efficiency of using a single source already required to provide heat in both services. The hot combustion products obtained through burning a fuel in the radiant section pass through the convection section and thence to the stack.

In the case of preheating or further heating the hot partially reformed effluent of the reaction section of the first reforming zone, the preheating is done in tubes provided in the radiantly heated portion of the reforming furnace since temperatures elsewhere in the furnace are not sufficient. The tubes used in such further heating are subjected to higher temperatures and substantially the same pressures as those in the reaction section of the furnace so that comparatively high velocity (or high pressure drop) is maintained in such preheating tubes. In this way, the inner diameter of the preheating tubes is appreciably reduced and the tube wall thickness is correspondingly reduced. In addition, high gas velocity improves heat transfer and thus reduces tube metal temperatures and raises permissible metal tensile stress.

As a result of supplying additional heat to the second reforming zone by means of intermediate heat exchange alone or in combination with reactant preheating, higher levels of conversion are obtained therein, other factors being equal. Thus, the first reforming zone can be operated at relatively lower levels of conversion. As a result, the steam and fuel requirements of the first reforming zone at a given pressure are reduced and very high pressures become technically and economically feasible. Furthermore, the catalyst-containing tubes in the primary reformer can be operated at reduced temperatures which permits use of higher tensile stresses and reduction in tube wall thickness. Since the overall process achieves a substantially complete conversion of the hydrocarbon, little or no hydrocarbon is lost as inerts in the subsequent synthesis process thus resulting in a highly efficient conversion of the hydrocarbon feedstock to the ultimate synthetic chemical.

For a better understanding of the invention, reference is had to the accompanying drawing and the following discussion of examples which together illustrate one preferred method of practicing the invention and its advantages as contrasted with methods not utilizing the invention.

EXAMPLE I

Referring to FIGURE 1 about 100 mols per hour of desulfurized natural gas of the composition given in Table I below are introduced into primary reformer furnace 11 through line 12.

*Table I*

| Component: | Mols per hour |
|---|---|
| $N_2$ | 0.9 |
| $CH_4$ | 94.3 |
| $C_2H_6$ | 2.8 |
| $C_3H_8$ | 1.0 |
| $C_4H_{10}$ | 0.6 |
| $C_5H_{12}$ | 0.4 |
| | 100.0 |

The natural gas in line 12 at about 100° F. and about 250 p.s.i.g. is preheated to a temperature of about 700° F. by passage through a heating coil in the convection section of furnace 11. An amount of steam sufficient to provide a steam-carbon ratio of about 3.8 is combined with the preheated natural gas in line 14 after being itself preheated by passage from line 13 through another heating coil in the convection section of furnace 11. The steam-hydrocarbon mixture is reformed in the radiant section of furnace 11 by passage through a plurality of tubes 16 therein containing reforming catalyst. The products of reforming from tubes 16 are collected in line 17 where the gases are at a pressure of about 205 p.s.i.g., at a temperature of about 1450° F. and have the composition given in Table II below. Unconverted methane amounts to about 7.7 mol percent of dry gas.

*Table II*

| Component: | Mols per hour |
|---|---|
| CO | 36.0 |
| $H_2O$ | 286.6 |
| $CO_2$ | 42.3 |
| $H_2$ | 269.1 |
| $N_2$ | 0.9 |
| $CH_4$ | 28.9 |
| | 663.8 |

The effluent of furnace 11 in line 17 is mixed with about 143 mols per hour of compressed air introduced through line 18 into a mixer at the top of secondary reformer 19. The effluent of primary reforming furnace 11 suffers a heat loss of about 120° F. while passing to secondary reformer 19 and so enters the latter at a temperature of about 1330° F. The mixed gases are injected directly into catalyst bed 21 of the secondary reformer 19 in which the conversion of methane to hydrogen and carbon oxides is substantially completed. By virtue of the combined exothermic partial oxidation and endothermic steam reforming which occur in bed 21, the temperature of the gases which emerge from the bottom thereof is about 1690° F. As shown on the drawing, a quench is introduced through line 24 consisting of steam and water to cool the hot effluent from catalyst bed 21 to the substantially lower temperature required in the downstream waste heat recovery and CO shift conversion equipment.

The quenched reformed product is withdrawn at a temperature of about 1100° F. and at a pressure of about 190 p.s.i.g. through line 26 and flows to waste heat recovery and CO shift conversion equipment (not shown). Its composition is given in Table III below.

Table III

| Component: | Mols per hour |
|---|---|
| CO | 59.8 |
| $H_2O$ | 498.0 |
| $CO_2$ | 45.9 |
| $H_2$ | 295.3 |
| $N_2$ and A | 112.5 |
| $CH_4$ | 1.5 |
| | 1013.0 |

Unconverted $CH_4$ (dry basis), mol percent _____ 0.29

In the present example, the catalyst used in primary reformer 11 is a standard commercial high-nickel reforming catalyst while the catalyst in bed 21 of secondary reformer 19 comprises two catalysts, namely, a standard commercial chromia catalyst and a standard commercial high nickel catalyst with the chromia catalyst forming the top part of bed 21. Residence times in the two reforming zones are about 2.6 seconds in the case of primary reformer 11 and about 2.6 seconds in the case of secondary reformer 19.

EXAMPLE II

Referring again to FIGURE 1, consider another case in which it is desired to operate the primary reformer 11 at an outlet pressure of 500 p.s.i.g. while maintaining the residual methane in the reformed product 26 at the same level as that of Example I. The amount and composition of natural gas feed in line 12 and the preheat temperatures are identical with those of Example I. The amount of steam, however, introduced through line 13, is increased to a level equivalent to a steam-carbon ratio of 7.2. As in Example I, the amount of air introduced into the system is about 143 mols per hour. Catalysts and residence times used in the primary reformer 11 and the secondary reformer 19 are identical in this example with those set forth for Example I.

The temperatures, compositions, and flows of the streams leaving the primary reformer 11 and the secondary reformer 19 are given in Table IV below.

Table IV

| | Primary Reformer, Mols per hour | Quench Reformed Product, Mols per hour |
|---|---|---|
| CO | 25.1 | 42.0 |
| $H_2O$ | 631.5 | 991.0 |
| $CO_2$ | 58.2 | 64.0 |
| $H_2$ | 299.5 | 313.2 |
| $N_2$ and A | 0.9 | 113.8 |
| $CH_4$ | 24.0 | 1.5 |
| | 1,039.2 | 1,525.5 |
| Temperature, °F | 1,440–1,450 | 1,100 |
| Unconverted $CH_4$ (dry basis), Mol percent | 5.9 | 0.29 |

It will be observed that in order to obtain the same residual methane level in the quenched reformed product 26 as in Example I at a pressure of about 500 p.s.i.g. at the outlet of primary reformer 11 as opposed to about 205 p.s.i.g. in Example I, it is necessary to inject extremely large amounts of steam into the system to overcome the adverse effect of pressure on methane equilibrium. The disadvantages associated with the use of this expedient are that the volumetric flow of gas through the reformer tubes 16 increases thereby necessitating an increase in the number of high alloy tubes and the fuel fired in the radiant section. Also the amount of steam present in the quenched reformed product is considerably higher than that required for process equipment downstream of the secondary reformer. For most purposes, the cumulative effect of these disadvantages is so great as to render this approach to high-pressure reforming commercially unattractive and impractical.

EXAMPLE III

Figure 2:
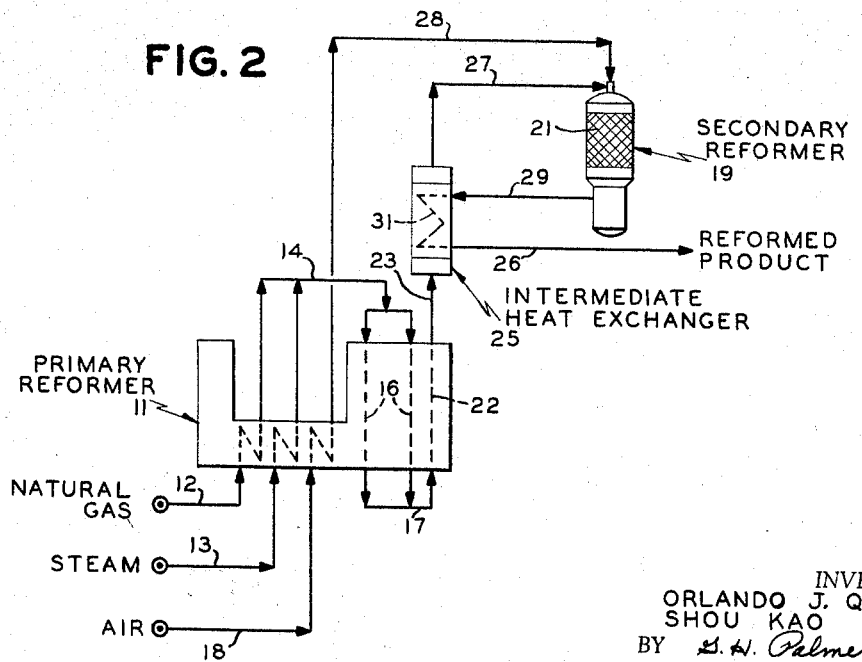

Referring now to FIGURE 2, one preferred embodiment of the present invention employing intermediate heat exchange is shown. The amount and composition of natural gas feed in line 12 is identical with that in Examples I and II. The amount of steam introduced through line 13 is sufficient in this example to provide a steam-carbon ratio of about 3.8. The preheat temperature in line 14 is about 700° F. The composition of the effluent from the reaction section (constituted by catalyst tubes 16) of primary reforming furnace 11 is given in Table V below.

Table V

| Component: | Mols per hour |
|---|---|
| CO | 20.3 |
| $H_2O$ | 312.2 |
| $CO_2$ | 37.3 |
| $H_2$ | 202.2 |
| $N_2$ | 0.9 |
| $CH_4$ | 49.5 |
| | 622.4 |

The effluent from the reaction section of primary reformer 11 in line 17, instead of being passed directly to secondary reformer 19 as in Examples I and II, is preheated in unpacked tubes 22 (constituting one preheating section) in the radiant section of primary reformer 11 and is then passed through line 23, intermediate heat exchanger 25 and line 27 to secondary reformer 19. By means of the heating in tubes 22, the temperature of the gas is raised from about 1410° F. to about 1470° F. This gas in line 23 is at a pressure of about 500 p.s.i.g. As in Example I, the effluent of primary reformer 11 suffers a heat loss of about 120° F. so that the temperature of the effluent is about 1350° F. as it enters heat exchanger 25.

The extent of heating done in intermediate heat exchanger 25 depends in part upon the type of heat exchanger used. In the present example, a U-tube type heat exchanger is used such that the temperature in line 23 of about 1350° F. is raised to about 1600° F. in line 27. Additional heat is also supplied to secondary reformer 19 by means of preheating the air in line 18 prior to introducing it into secondary reformer 19. Approximately 143 mols per hour of air are passed through heating tubes in the convection section of primary reforming furnace 11 by means of which the temperature of the air fed to secondary reformer 19 through line 28 is raised to about 1400° F.

The reformed products emerging from catalyst bed 21 of secondary reformer 19 are not quenched in this case but are recovered in line 29 at a temperature of about 1800° F., employed in intermediate heat exchanger 25 and recovered in line 26 at a temperature of about 1600° F. The final reformed product in line 26 has the composition given in Table VI below.

Table VI

| Component: | Moles per hour |
|---|---|
| CO | 63.5 |
| $H_2O$ | 318.7 |
| $CO_2$ | 42.2 |
| $H_2$ | 291.6 |
| $N_2$ and A | 112.5 |
| $CH_4$ | 1.5 |
| | 830.0 |

The catalysts used and the residence times of reactants over the catalyst beds are again identical in this example with those set forth for Example I.

As mentioned, the degree of further heating of the primary reformer effluent obtainable in intermediate heat exchanger 25 depends in part on the type of heat exchanger which is used. In the specific embodiment described, a U-tube type exchanger is used which, for the flow rates set forth for the example, had a maximum heating duty of about 1.5 million B.t.u.'s per hour. The quantity of heat transfer obtained is limited by the condition of "temperature cross." Somewhat better heat transfer is obtained by means of a single-pass heat exchanger where the outlet temperature of primary reforming furnace 11 can be still lower, i.e., about 1370° F. rather than about 1450° F. With a single-pass heat exchanger, the effluent in line 23 at about 1370° F. can be heated to a temperature of about 1735° F. in line 27. With the effluent of the secondary reformer in line 29 at 1800° F. as before, the final temperature of the reformed product in line 26 is about 1500° F. In this case, the total amount of heat transferred is approximately 2.3 million B.t.u.'s per hour.

A somewhat greater amount of further heating is possible along with a slight reduction in the residual methane level where the intermediate heat exchanger 25 is packed with a bed of reforming catalyst, for example, as shown diagrammatically at 31 in FIGURE 2 with the hot effluent of the secondary reformer 19 passing through tubes positioned in the catalyst bed. These effects result from an increase in total volume of catalyst and an increase in the driving force for heat transfer.

A comparison of Examples I, II and III shows that, by means of the present invention, substantial reductions in the reforming steam requirement and in maximum temperatures in primary reforming at a given pressure and methane conversion are made by providing for intermediate heat exchange with or without separate preheating of one or both of the reactant streams supplied to the secondary reformer. In Example I, it was shown that to produce a reformed gas having a methane level of 0.29 mol percent (dry basis) at a pressure of about 205 p.s.i.g. and at a temperature of about 1450° F. without intermediate heat exchange, the required steam-carbon ratio is about 3.8. In Example II, to maintain the same residual methane level in the product gas at a reforming pressure of about 500 p.s.i.g. but with the same temperature of about 1450° F. without intermediate heat exchange, it is necessary to increase the steam-carbon ratio to about 7.2. However, in Example III at a reforming pressure of about 500 p.s.i.g. and with intermediate heat exchange and separate preheating of the reactant streams supplied to the secondary reformer, it is possible to obtain the same residual methane level in the product gas while reducing the steam-carbon ratio to the level required at about 205 p.s.i.g. in Example I, i.e., about 3.8, and nevertheless permit a reduction in the reformer catalyst tube outlet temperature to about 1410° F.

Reduction in the steam requirement is advantageous in several ways. Thus, it means a reduction in the total throughput of the reaction section of the primary reformer which in turn means a reduction in the catalyst required to provide a given residence time. Smaller or fewer catalyst tubes may therefore be used. In addition, less fuel is required to be burned in the radiant section of the primary reformer to provide the lower temperature of the reduced throughput. In this connection, it should be noted that the fuel savings just mentioned are not counterbalanced by the increased heating duty due to any use of reactant preheat but that there is a net reduction in the total heating duty of the furnace even with reactant preheat.

Reduction in maximum temperature in primary reforming also has important advantages. At lower temperatures, the thickness of the catalyst tubes can be reduced because of the higher tensile stresses associated with low tube metal temperature. In this regard, it should be noted that if primary reforming were carried out at standard temperatures of 1475–1500° F., the wall thickness of the catalyst tubes would be excessive at a pressure of 500 p.s.i.g.

The indicated specific advantages of operating in accordance with the invention make possible significant savings in the capital and operating costs of installations for the production of hydrogen in general and ammonia in particular. Thus, investment can be reduced because of the savings associated with the reduction in the size of reforming equipment and the reduction in horsepower requirements of synthesis gas compression. In terms of operating costs, savings are realized because of the reduction in fuel required for the primary reformer and power for synthesis compression equipment.

Subsequent processing of the reformed product will depend upon the intended use of the product. For example, in the case of its use for the synthesis of ammonia, the removal of carbon oxides is necessary. This can be achieved by one or more stages of shift conversion followed by selective absorption of carbon dioxide in a suitable solvent such as monoethanolamine or hot potassium carbonate. Residual amounts of carbon monoxide can be removed by methanation, i.e., catalytic conversion of carbon monoxide with hydrogen to form methane and water, or by absorption in a suitable solvent such as copper ammonium acetate.

It will be understood that various valves, pumps, compressors, controls and related auxiliary equipment are required in practicing the described process. In the interest of simplicity, such items have not been shown or described since the need for them, their location, and their manner of use are well known to those skilled in the art.

The foregoing examples illustrate preferred methods of practicing the invention and are therefore not to be construed as limitative. Various alterations and modifications to the specific method described will be apparent to those skilled in the art from the foregoing and may be used without departing from the scope of the invention.

What is claimed is:

1. A method for the production of hydrogen which comprises contacting a vaporized hydrocarbon with steam in the presence of reforming catalyst in a first indirectly heated reforming zone to partially reform said hydrocarbon, further heating effluent of the first reforming zone by heat exchange with a second effluent to be described, contacting further heated effluent of the first reforming zone with steam and an oxygen-containing gas in the presence of reforming catalyst in a second unheated reforming zone to substantially complete the reforming of said hydrocarbon, and cooling effluent of the second reforming zone constituting said second effluent by said heat exchange with effluent of the first reforming zone.

2. A method for the production of hydrogen which comprises contacting a vaporized hydrocarbon with steam in the presence of reforming catalyst in a first indirectly heated reforming zone maintained at a superatmospheric pressure to partially reform said hydrocarbon, further heating effluent of the first reforming zone by about 100° F. to about 475° F. by heat exchange with a second effluent to be described, contacting further heated effluent of the first reforming zone with steam and an oxygen-containing gas in the presence of reforming catalyst in a second unheated reforming zone maintained at a superatmospheric pressure to substantially complete the reforming of said hydrocarbon, and cooling effluent of the second reforming zone constituting said second effluent by said heat exchange with effluent of the first reforming zone.

3. A method for the production of hydrogen which comprises contacting a vaporized hydrocarbon with steam in the presence of reforming catalyst in a first indirectly heated reforming zone maintained at a superatmospheric pressure to partially reform said hydrocarbon, further heating effluent of the first reforming zone by about 100° F. to about 475° F. to a final temperature in the range of about 1400 to about 1775° F. by heat exchange with a second effluent to be described, contacting further heated effluent of the first reforming zone with steam and an oxygen-containing gas in the presence of reforming catalyst in a second unheated reforming zone maintained at a superatmospheric pressure to substantially complete the reforming of said hydrocarbon, and cooling effluent of the second reforming zone constituting said second effluent by about 100° F. to about 400° F. to a temperature in the range of about 1700 to about 1400° F. by said heat exchange with effluent of the first reforming zone.

4. A method for the production of hydrogen which comprises contacting a vaporized hydrocarbon with steam in the presence of reforming catalyst in a first indirectly heated reforming zone maintained at a pressure of about 175 to about 700 p.s.i.g., an outlet temperature of about 1300 to about 1600° F. for a residence time of about 0.5 to about 10 seconds, sufficient steam being supplied to said first reforming zone to give a concentration of residual methane in the effluent therefrom of about 3 to about 25 mol percent on a dry basis including a steam-carbon ratio of about 2.5 to about 7.5, further heating effluent of the first reforming zone by about 100° F. to about 475° F. by heat exchange with a second effluent to be described, contacting further heated effluent of the first reforming zone with about 0.4 to about 1.6 mols of steam per mol of dry gas and about 0.05 to about 0.15 mol of oxygen per mol of dry gas in the presence of reforming catalyst in a second unheated reforming zone maintained at a pressure substantially the same as that of said first reforming zone and at an outlet temperature of about 1600° F. to about 1800° F., the residence time in said second reforming zone being greater than about 0.5 second and sufficient to produce a gas having a residual methane concentration of less than about 2.0 mol percent on a dry basis, and cooling effluent of the second reforming zone constituting said second effluent by about 100° F. to about 400° F. by said heat exchange with effluent of the first reforming zone.

5. A method for the production of hydrogen which comprises contacting a vaporized hydrocarbon with steam in the presence of reforming catalyst in a first indirectly heated reforming zone maintained at a pressure of about 175 to about 700 p.s.i.g., an outlet temperature of about 1300 to about 1600° F. for a residence time of about 0.5 to about 10 seconds, sufficient steam being supplied to said first reforming zone to give a concentration of residual methane in the effluent therefrom of about 3 to about 25 mol percent on a dry basis including a steam-carbon ratio of about 2.5 to about 7.5, further heating effluent of the first reforming zone by about 100° F. to about 475° F. by indirect heat exchange with a second effluent to be described, contacting further heated effluent of the first reforming zone with about 0.4 to about 1.6 mols of steam per mol of dry gas and about 0.05 to about 0.15 mol of oxygen per mol of dry gas in the presence of reforming catalyst in a second unheated reforming zone maintained at a pressure of about 165 to about 670 p.s.i.g. and at an outlet temperature of about 1600° F. to about 1800° F., the residence time in said second reforming zone being greater than about 0.5 second and sufficient to produce a gas having a residual methane concentration of less than about 2.0 mol percent on a dry basis, and cooling effluent of the second reforming zone constituting said second effluent by about 100° F. to about 400° F. by said indirect heat exchange with effluent of the first reforming zone.

6. A method for the production of hydrogen which comprises contacting a vaporized hydrocarbon with steam in the presence of reforming catalyst in a reaction section of a first indirectly heated reforming zone maintained at a pressure of about 175 to about 700 p.s.i.g., an outlet temperature of about 1300 to about 1600° F. for a residence time of about 0.5 to about 10 seconds, sufficient steam being supplied to said reaction section to give a concentration of residual methane in the effluent therefrom of about 3 to about 25 mol percent on a dry basis including a steam-carbon ratio of about 2.5 to about 7.5, further heating effluent of the first reforming zone by about 100° F. to about 475° F. by indirect heat exchange with a second effluent to be described, preheating oxygen to a temperature of about 800° F. to about 1500° F. by passing said oxygen through a preheating section of said first indirectly heated reforming zone, contacting further heated effluent of the first reforming zone with about 0.4 to about 1.6 mols of steam per mol of dry gas and about 0.05 to about 0.15 mol of preheated oxygen per mol of dry gas in the presence of reforming catalyst in a second unheated reforming zone maintained at a pressure of about 165 to about 670 p.s.i.g. and at an outlet temperature of about 1600° F. to about 1800° F., the residence time in said second reforming zone being greater than about 0.5 second and sufficient to produce a gas having a residual methane concentration of less than about 2.0 mol percent on a dry basis and cooling effluent of the second reforming zone constituting said second effluent by about 100° F. to about 400° F. by said indirect heat exchange with effluent of the reaction section of the first reforming zone.

7. A method for the production of hydrogen which comprises contacting a vaporized hydrocarbon with steam in the presence of reforming catalyst in a reaction section of a first indirectly heated reforming zone maintained at a pressure of about 175 to about 700 p.s.i.g., an outlet temperature of about 1300 to about 1600° F. for a residence time of about 0.5 to about 10 seconds, sufficient steam being supplied to said reaction section to give a concentration of residual methane in the effluent therefrom of about 3 to about 25 mol percent on a dry basis including a steam-carbon ratio of about 2.5 to about 7.5, preheating effluent of said reaction section of said first reforming zone to about 1400° F. to about 1600° F. by passing said effluent through a preheating section of said first indirectly heated reforming zone, further heating effluent of said preheating section by about 100° F. to about 475° F. by heat exchange with a second effluent to be described, contacting further heated effluent of said preheating section with about 0.4 to about 1.6 mols of steam per mol of dry gas and about 0.05 to about 0.15 mol of oxygen per mol of dry gas in the presence of reforming catalyst in a second unheated reforming zone maintained at a pressure of about 165 to about 670 p.s.i.g. and at an outlet temperature of about 1600° F. to about 1800° F., the residence time in said second reforming zone being greater than about 0.5 second and sufficient to produce a gas having a residual methane concentration of less than about 2.0 mol percent on a dry basis, and cooling effluent of the second reforming zone constituting said second effluent by about 100° F. to about 400° F. by said indirect heat exchange with effluent of the preheating section of the first reforming zone.

8. A method for the production of hydrogen which comprises contacting a vaporized hydrocarbon with steam in the presence of reforming catalyst in a reaction section of a first indirectly heated reforming zone maintained at a pressure of about 175 to about 700 p.s.i.g., an outlet temperature of about 1300 to about 1600° F. for a residence time of about 0.5 to about 10 seconds, sufficient steam being supplied to said reaction section to give a concentration of residual methane in the effluent therefrom of about 3 to about 25 mol percent on a dry basis including a steam-carbon ratio of about 2.5 to about 7.5, preheating effluent of said reaction section to about 1400° F. to about 1600° F. by passing said effluent through a first preheating section of said indirectly heated reforming zone, further heating effluent of said first preheating section by about 100° F. to about 475° F. by indirect heat exchange with a second effluent to be described, preheating oxygen to a temperature of about 800° F. to about 1500° F. by passing said oxygen through a second preheating section of said first indirectly heated reforming zone, contacting further heated effluent of said first preheating section with about 0.4 to about 1.6 mols of steam per mol of dry gas and about 0.05 to about 0.15 mol of preheated oxygen per mol of dry gas in the presence of reforming catalyst in a second unheated reforming zone maintained at a pressure of about 165 to about 670 p.s.i.g. and at an outlet temperature of about 1600° F. to about 1800° F., the residence time in said second reforming zone being greater than about 0.5 second and sufficient to produce a gas having a residual methane concentration of less than about 2.0 mol percent on a dry basis, and cooling effluent of the second reforming zone constituting said second effluent by about 100° F. to about 400° F. by said indirect heat exchange with effluent of the first preheating section of the first reforming zone.

9. A method as defined in claim 8 in which the step of further heating effluent of the first preheating section by indirect heat exchange with effluent of the second reforming zone is carried out in the presence of reforming catalyst.

10. A method for the production of ammonia synthesis gas which comprises contacting a vaporized hydrocarbon with steam in the presence of reforming catalyst in a first indirectly heated reforming zone maintained at a pressure of about 350 to about 700 p.s.i.g., an outlet temperature of about 1350° F. to about 1500° F. for a residence time of about 1.5 to about 5 seconds, sufficient steam being supplied to said first reforming zone to give a concentration of residual methane in the effluent therefrom of about 3 to about 25 mol percent on a dry basis including a steam-carbon ratio of about 3.0 to about 6.5, further heating effluent of the first reforming zone by about 100° F. to about 475° F. by heat exchange with a second effluent to be described, contacting further heated effluent of the first reforming zone with about 0.6 to about 1.1 mols of steam per mol of dry gas and about 0.25 to about 0.75 mol of air per mol of dry gas in the presence of reforming catalyst in a second unheated reforming zone maintained at a pressure of about 350 to about 700 p.s.i.g. and at an outlet temperature of about 1600 to about 1800° F., the residence time in said second reforming zone being sufficient to produce a gas having a residual methane concentration of less than about 2.0 mol percent on a dry basis including a residence time of about 1.0 to about 10 seconds and cooling effluent of the second reforming zone constituting said second effluent by about 100° F. to about 400° F. by said heat exchange with said effluent of the first reforming zone.

11. A method for the production of ammonia synthesis gas which comprises contacting a vaporized hydrocarbon with steam in the presence of reforming catalyst in a reaction section of a first indirectly heated reforming zone maintained at a pressure of about 350 to about 700 p.s.i.g., an outlet temperature of about 1350° F. to about 1500° F. for a residence time of about 1.5 to about 5 seconds, sufficient steam being supplied to said reaction section to give a concentration of residual methane in the effluent therefrom of about 3 to about 25 mol percent on a dry basis including a steam-carbon ratio of about 3.0 to about 6.5, preheating effluent of said reaction section by passing said effluent through a preheating section of said first indirectly heated reforming zone, further heating effluent of said preheating section by about 100° F. to about 475° F. by indirect heat exchange with a second effluent to be described, contacting further heated effluent of said preheating section with about 0.6 to about 1.1 mols of steam per mol of dry gas and about 0.25 to about 0.75 mol of air per mol of dry gas in the presence of reforming catalyst in a second unheated reforming zone maintained at a pressure of about 350 to about 700 p.s.i.g., and at an outlet temperature of about 1600 to about 1800° F., the residence time in said second reforming zone being sufficient to produce a gas having a residual methane concentration of less than about 2.0 mol percent on a dry basis including a residence time of about 1.0 to about 10 seconds, and cooling effluent of the second reforming zone constituting said second effluent by about 100° F. to about 400° F. by said indirect heat exchange with said effluent of the preheating section of the first reforming zone.

12. A method for the production of ammonia synthesis gas which comprises contacting a vaporized hydrocarbon with steam in the presence of reforming catalyst in a reaction section of a first indirectly heated reforming zone maintained at a pressure of about 350 to about 700 p.s.i.g., an outlet temperature of about 1350° F. to about 1500° F. for a residence time of about 1.5 to about 5 seconds, sufficient steam being supplied to said reaction section to give a concentration of residual methane in the effluent therefrom of about 3 to about 25 mol percent on a dry basis including a steam-carbon ratio of about 3.0 to about 6.5, preheating air to a temperature of about 800° F. to about 1500° F. by passing said air through a preheating section of said first indirectly heated reforming zone, further heating effluent of said reaction section by about 100° F. to about 475° F. by indirect heat exchange with a second effluent to be described, contacting further heated effluent of said reaction section with about 0.6 to about 1.1 mols of steam per mol of dry gas and about 0.25 to about 0.75 mol of preheated air per mol of dry gas in the presence of reforming catalyst in a second unheated reforming zone maintained at a pressure of about 350 to about 700 p.s.i.g. and at an outlet temperature of about 1600 to about 1800° F., the residence time in said second reforming zone being sufficient to produce a gas having a residual methane concentration of less than about 2.0 mol percent on a dry basis including a residence time of about 1.0 to about 10 seconds and cooling effluent of the second reforming zone constituting said second effluent by about 100° F. to about 400° F. by said indirect heat exchange with said effluent of the reaction section of the first reforming zone.

13. A method for the production of ammonia synthesis gas which comprises contacting a vaporized hydrocarbon with steam in the presence of reforming catalyst in a reaction section of a first indirectly heated reforming zone maintained at a pressure of about 350 to about 700 p.s.i.g., an outlet temperature of about 1350° F. to about 1500° F. for a residence time of about 1.5 to about 5 seconds, sufficient steam being supplied to said reaction section to give a concentration of residual methane in the effluent therefrom of about 3 to about 25 mol percent on a dry basis including a steam-carbon ratio of about 3.0 to about 6.5, preheating effluent of said reaction section by passing said effluent through a first preheating section of said first indirectly heated reforming zone, further heating effluent of the first preheating section by about 100° F. to about 475° F. by indirect heat exchange with a second effluent to be described, preheating air to a temperature of about 800° F. to about 1500° F. by passing said air through a second preheating section of said first indirectly heated reforming zone, contacting further heated effluent of said first preheating section with about 0.6 to about 1.1 mols of steam per mol of dry gas and about 0.25 to about 0.75 mol of preheated air per mol of dry gas in the presence of reforming catalyst in a second unheated reforming zone maintained at a pressure of about 350 to about 700 p.s.i.g. and at an outlet temperature of about 1600 to about 1800° F., the residence time in said second reforming zone being sufficient to produce a gas having a residual methane concentration of less than about 2.0 mol percent on a dry basis including a residence time of about 1.0 to about 10 seconds, and cooling effluent of the second reforming zone constituting said second effluent by about 100° F. to about 400° F. by said indirect heat exchange with said effluent of the first preheating section of the first reforming zone.

14. In a method for the production of hydrogen comprising contacting a vaporized hydrocarbon with steam in the presence of reforming catalyst in a first indirectly heated reforming zone to partially reform said hydrocarbon and contacting effluent of the first reforming zone with steam and an oxygen-containing gas in the presence of reforming catalyst in a second unheated reforming zone to substantially complete the reforming of said hydrocarbon, the improvement which comprises further heating effluent of said first reforming zone by heat exchange with effluent of said second reforming zone prior to contacting effluent of said first reforming zone in said second reforming zone.

References Cited by the Examiner

UNITED STATES PATENTS

| | | | |
|---|---|---|---|
| 1,988,759 | 1/1935 | Svanoe | 23—212 |
| 2,829,113 | 4/1958 | Barry et al. | 23—212 XR |
| 2,911,288 | 11/1959 | Viles | 23—212 |
| 3,081,268 | 3/1963 | Marshall | 23—212 XR |

OSCAR R. VERTIZ, *Primary Examiner.*

MAURICE A. BRINDISI, *Examiner.*

A. J. STEWART, E. STERN, *Assistant Examiners.*